(12) United States Patent
Melkote et al.

(10) Patent No.: US 11,794,811 B2
(45) Date of Patent: Oct. 24, 2023

(54) DETERMINING ESTIMATED STEERING DATA FOR A VEHICLE

(71) Applicant: Zoox, Inc., Foster City, CA (US)

(72) Inventors: Ahditya Melkote, Foster City, CA (US); Vishveshwar Ramanathan Subramanian, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 221 days.

(21) Appl. No.: 17/246,410

(22) Filed: Apr. 30, 2021

(65) Prior Publication Data

US 2022/0348256 A1   Nov. 3, 2022

(51) Int. Cl.
| | |
|---|---|
| *G01K 13/00* | (2021.01) |
| *G01S 15/02* | (2006.01) |
| *B60G 17/00* | (2006.01) |
| *B60G 11/27* | (2006.01) |
| *B60P 1/00* | (2006.01) |
| *B60G 1/00* | (2006.01) |
| *B62D 15/02* | (2006.01) |
| *B62D 1/02* | (2006.01) |
| *B60W 30/02* | (2012.01) |

(52) U.S. Cl.
CPC .......... *B62D 15/026* (2013.01); *B60W 30/02* (2013.01); *B62D 1/02* (2013.01); *B62D 15/021* (2013.01); *B60W 2420/403* (2013.01); *B60W 2420/52* (2013.01)

(58) Field of Classification Search
None
See application file for complete search history.

(56) References Cited

U.S. PATENT DOCUMENTS

| | | | | |
|---|---|---|---|---|
| 8,571,756 | B2 * | 10/2013 | Ersoy | B60G 17/019 280/5.52 |
| 2003/0075882 | A1 | 4/2003 | Delorenzis | |
| 2006/0022420 | A1 * | 2/2006 | Pressler | B62D 15/023 280/93.512 |
| 2006/0119064 | A1 * | 6/2006 | Mizuno | B60G 21/10 280/124.157 |

(Continued)

FOREIGN PATENT DOCUMENTS

| | | |
|---|---|---|
| JP | 2019084839 A | 6/2019 |
| KR | 20100072994 A | 7/2010 |

OTHER PUBLICATIONS

PCT Search Report and Written Opinion dated Aug. 11, 2022 for PCT Application No. PCT/US22/26909, 13 pages.

(Continued)

*Primary Examiner* — Adam D Tissot
*Assistant Examiner* — Laura E Linhardt
(74) *Attorney, Agent, or Firm* — Lee & Hayes, P.C.

(57) ABSTRACT

Techniques for using ball joint sensor data to determine conditions relevant to a vehicle are described in this disclosure. For example, in one example, the ball joint sensor data may be used to determine estimated steering data. The estimated steering data may be directly used to navigate through an environment, such as by the vehicle relying on the estimated steering data when planning, tracking, or executing a driving maneuver. Also, the estimated steering data may be used to verify the reliability of other steering sensor data used to navigate through the environment.

20 Claims, 6 Drawing Sheets

(56) References Cited

U.S. PATENT DOCUMENTS

| | | | |
|---|---|---|---|
| 2008/0191440 A1* | 8/2008 | Ryshavy | B60G 7/003 |
| | | | 280/124.1 |
| 2013/0336090 A1* | 12/2013 | Tran | B60G 17/01908 |
| | | | 367/13 |
| 2019/0031229 A1* | 1/2019 | Sakaguchi | B62D 5/0463 |
| 2022/0332317 A1* | 10/2022 | Lewandowski | B60W 30/146 |
| 2022/0348187 A1 | 11/2022 | Melkote | |

OTHER PUBLICATIONS

Office Action for U.S. Appl. No. 17/246,375, dated Feb. 1, 2023, Melkote, "Determining Vehicle Ride Height Using a Ball Joint Sensor", 25 pages.

* cited by examiner

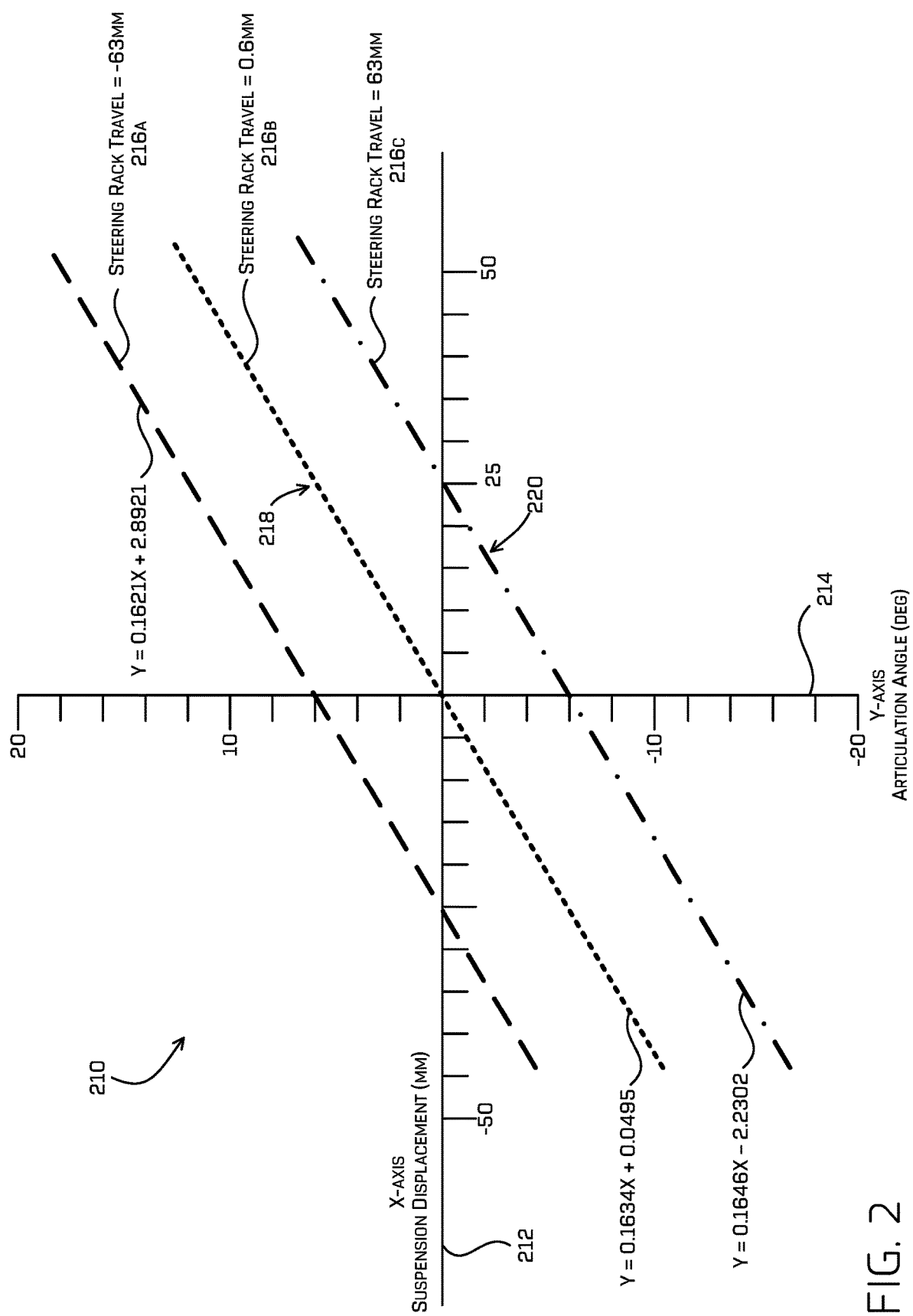

DETERMINING ESTIMATED STEERING DATA FOR A VEHICLE

BACKGROUND

A vehicle may include various sensors for many different purposes. For example, sensors may be used to detect information about a surrounding environment (e.g., other vehicles, roadway conditions, pedestrians, street signs, etc.), as well as to monitor vehicle operations (e.g., braking, accelerating, steering, system(s) status, vehicle position, etc.). Accuracy and reliability of the sensor data is important to allow the vehicle to safely and reliably navigate through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates a graph showing data representing suspension displacement, steering rack travel, and ball joint stud articulation angle.

DETAILED DESCRIPTION

Figure 1A:
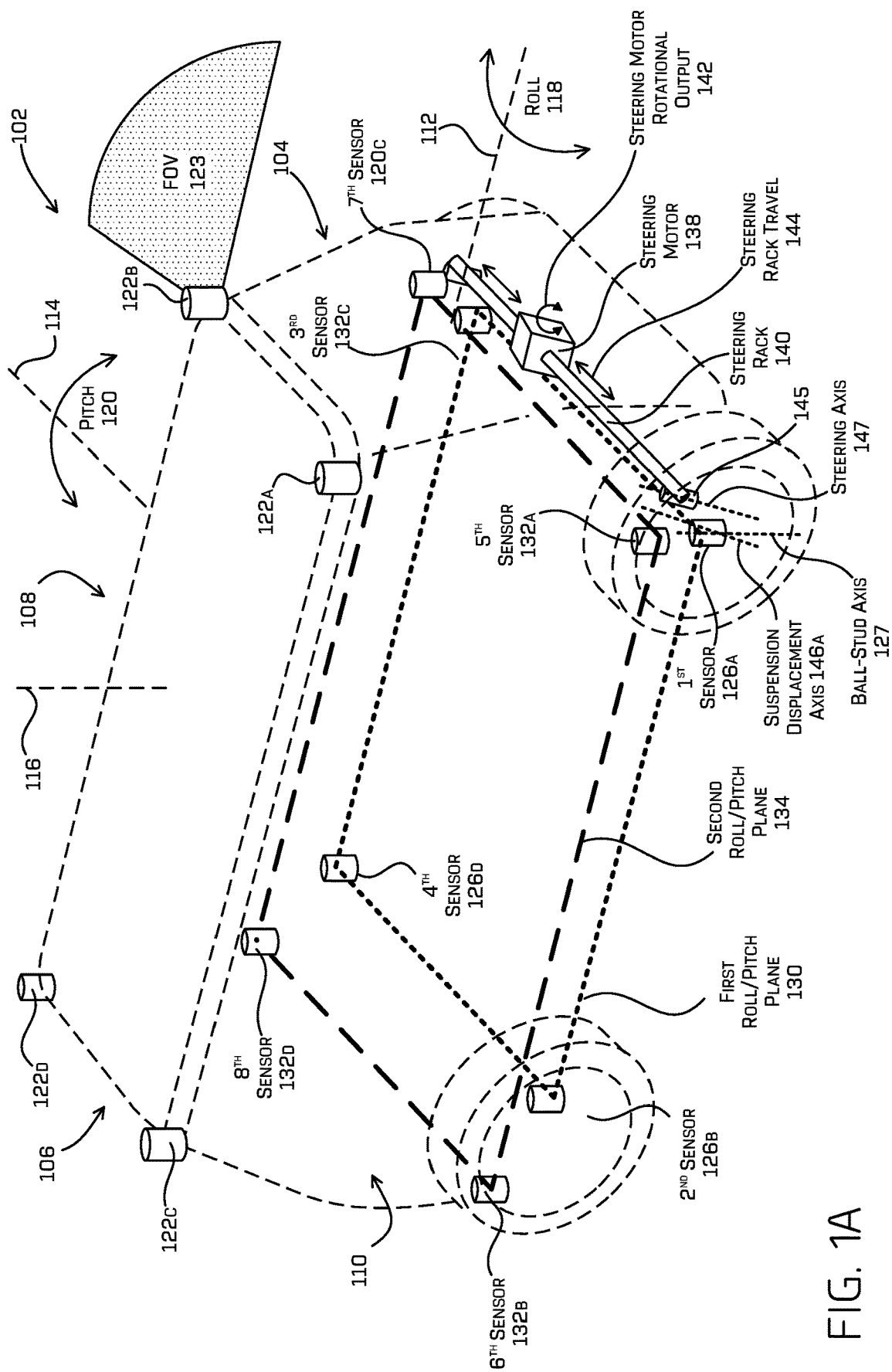
FIG. 1A illustrates a perspective view of an example vehicle relative to a ground plane.

As discussed above, accuracy and reliability of the sensor data is important to allow a vehicle to safely and reliably navigate through an environment. This application relates to techniques for using ball joint sensor data to determine various operating parameters and conditions relevant to a vehicle. In one example, ball joint sensor data may include sensor data from a ball joint sensor, which measures an articulation (e.g., angle or other articulation measure) of a ball joint coupled to a suspension assembly of the vehicle. The ball joint sensor data may be directly used to navigate through an environment (e.g., relied on by the vehicle when planning and/or executing driving operations) and/or used to verify the reliability of other sensor data used to navigate through the environment. For example, ball joint sensor data may be used to determine a vehicle ride height of various portions of the vehicle (e.g., relative to a ground plane), and vehicle ride height may be relevant to some vehicle operations, such as for determining a vehicle roll or a vehicle pitch. Among other things, the vehicle roll and pitch may affect how sensor data is processed, and in some instances, the vehicle roll and pitch may be used to calibrate or determine a field of view for a sensor (e.g., lidar sensor, camera, time-of-flight sensor, sonar sensor, radar sensor, etc.). In another example, ball joint sensor data may be used to estimate steering data, which may be relied on by the vehicle (e.g., to track movement along a vehicle trajectory) and/or may be used to verify other sensor data (e.g., from a steering motor sensor). The ball joint sensor may be used in addition to or instead of other sensors to provide a more accurate and/or reliable measure the condition (e.g., ride height, roll, pitch, steering angle, etc.).

A vehicle may include various types of suspension for controlling interactions between the vehicle (e.g., vehicle chassis) and the vehicle's wheels and tires. For example, each wheel of the vehicle may attach to the vehicle chassis via an independent suspension assembly, and often, each suspension assembly can contribute to, or affect, the vehicle ride height. In one aspect of this disclosure, a ball joint is attached to the suspension assembly and articulates (e.g., angularly adjusts) in response to motion between the suspension assembly and the vehicle. In addition, the ball joint can include a sensor (e.g., a hall effect, magnetic pickup, optical, potentiometer, or other sensor) that can measure an articulation (e.g., angle) of the ball joint.

The ball joint sensor output (e.g., articulation angle or other measure of articulation) may be used in various manners to measure a vehicle condition. In one aspect of this disclosure, the ball joint sensor output may be used to determine a ride height of at least a portion of the vehicle (e.g., in a portion of the vehicle in which the ball joint is positioned). For example, an articulation angle that is output by the ball joint sensor may, directly or indirectly, correlate with a ride height of the respective corner of the vehicle at which the ball joint is disposed. That is, a ball joint may include a neutral position, such as when the vehicle is on a flat surface and all four struts are at a baseline. In another example, a neutral position may be determined when a vehicle is started or through some other startup calibration. As the vehicle maneuvers (e.g., drives forward or reverse) a difference between the measured position of the ball joint and the neutral position of the ball joint is indicative of a change in ride height of a respective portion (e.g., corner, wheel, quadrant, etc.) of the vehicle. In some instances, the alignment or misalignment of components in the suspension assembly and vehicle chassis may affect the correlation between the ball joint sensor output and the ride height. For example, a stud of the ball joint may not be axially aligned with an orientation of displacement travel (e.g., kingpin axis or other suspension-assembly travel axis), and as such, an aspect of this disclosure is directed to techniques for determining, when axes are not aligned or parallel, ride height from the ball joint sensor output.

As mentioned briefly above, ride height may be used to determine vehicle roll and pitch, which may affect how sensor data (e.g. perception sensor data) is processed. In some instances, vehicle roll and pitch may be monitored for compliance with vehicle standards, such as Automotive Safety Integrity Level D (ASIL D). For example, ASIL D may define a standard related to monitoring vehicle roll and pitch, which specifies one or more thresholds (e.g., amount of roll and pitch, max time durations, etc.) for minimizing risks of impacting a perception system (e.g., relying on lidar sensors, image sensors, etc.). As such, using ball joint sensors to determine ride height of one or more portions of a vehicle (and vehicle roll and pitch in turn) may improve compliance with safety standards. In addition, some vehicle may have other systems or sensors (e.g., chassis position sensors, strut extension sensors, etc.) that are also used to determine ride height independently of the ball joint sensors, and in this respect, using ball joint sensors in combination with these other systems may provide system redundancy and reduce a likelihood of system failure.

In addition to vehicle ride height, other variables or vehicle components may also interact with the suspension assembly and may affect an angle or position of the ball joint. For example, steering components (e.g., a steering rack) that affect a command angle of a vehicle wheel may interface with the suspension assembly (e.g., at a knuckle), such that changes in the steering component (e.g., rack travel or motor rotation in one direction or the other) also change the angle of the ball joint. As such, an aspect of the present disclosure includes techniques for estimating steering data (e.g., estimated steering rack travel and/or estimated motor rotation) based on output (e.g., articulation angle) of the ball joint sensor. For example, with a given ride height (e.g., suspension-displacement value, damper travel, or other suspension position or state as determined by another sensor, such as a chassis position sensor) and a detected articulation angle (e.g., determined from output of the ball joint sensor), steering data may be estimated (e.g., estimated rack travel or estimated motor rotation).

In some instances, the estimated steering data may be used to monitor operations of the vehicle (e.g., motion along a trajectory). In other aspects, the estimated steering data may be compared to steering sensor data from a steering sensor to assess the reliability of the steering sensor data. For example, a vehicle may include a steering motor that generates a rotational output, which is transferred to a wheel and/or to linear travel of the steering rack. A steering sensor may measure the rotation of the steering motor, and the rotation may be used to determine (e.g., from a correlation between rotation and linear rack travel) a steering rack travel (or other steering data associated with a command angle of the wheel). The steering rack travel determined from the rotation may be compared to the estimated rack travel (e.g., determined from the given ride height and ball joint output) to assess consistency. In some examples, if the data consistency is above a threshold, then the data may be deemed reliable for use by other operations, whereas data consistency below a threshold may suggest a deficiency or failure in the steering system (e.g., belt coupling steering motor to steering rack not providing intended correlation between motor rotation and steering rack travel). In additional examples, the data may be combined (e.g., average rack travel), and the combined rack travel data may be relied on by other operations. In certain examples, estimated steering data determined from a ball joint or other suspension sensor may be used in conjunction with steering data from other sensors (e.g., a sensor coupled to a steering rack and/or an IMU (inertial measurement unit)) to obtain a higher level of confidence or to compensate the other sensors if they are unavailable (e.g., failed or blocked).

The techniques described herein can be implemented in a number of ways to use ball joint sensor data to measure a vehicle condition. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle. In another example, the techniques can be utilized in an aviation or nautical context, or in any component involving objects or entities that may be associated with behavior that is unknown to the component. In some examples, the techniques can be utilized in contexts outside of autonomous vehicles. Furthermore, the techniques described herein can be used with real data (e.g., captured using sensor(s)), simulated data (e.g., generated by a simulator), or any combination of the two.

Figure 1B:
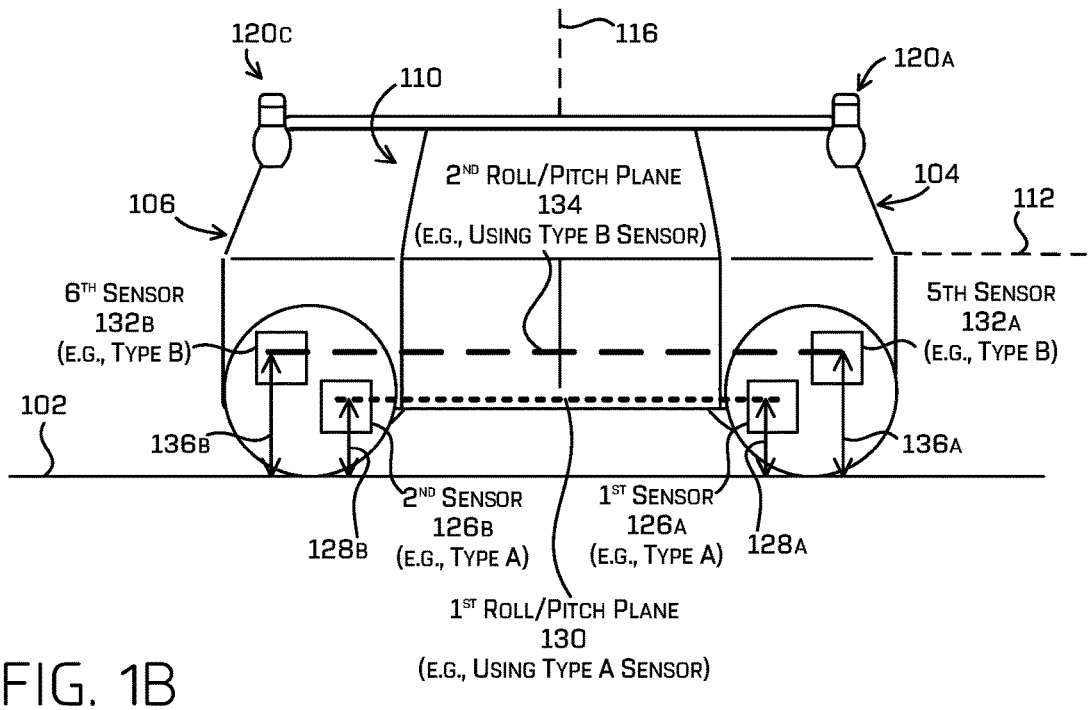
FIG. 1B illustrates a side view of an example vehicle relative to a ground plane.
Figure 1C:
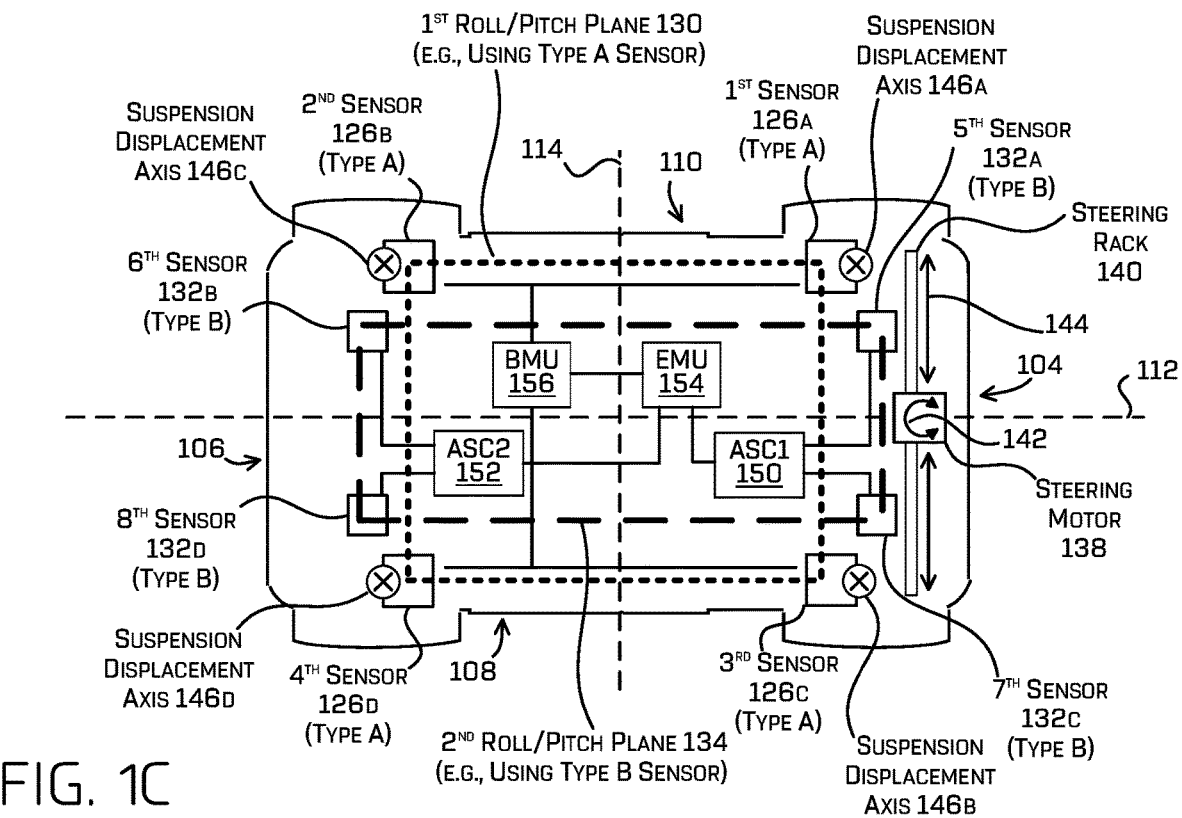
FIG. 1C illustrates a plan view showing an underneath side of an example vehicle.

FIG. 1A, FIG. 1B, and FIG. 1C illustrate different views of an example vehicle 100 with components for using ball joint sensors to determine various parameters relevant to the vehicle 100. FIG. 1A depicts a perspective view of the vehicle 100, which is ghosted in broken lines to help illustrate internally positioned components; FIG. 1B depicts a right-side view of the vehicle 100 relative to a ground plane 102; and FIG. 1C presents bottom view from underneath the vehicle 100. Among other things, the vehicle 100 includes a front end 104, a rear end 106, a left side 108, and a right side 110. In addition, for reference in this disclosure, the vehicle 100 includes a longitudinal axis 112 extending along a front-to-back orientation (e.g., longitudinal orientation) and a lateral axis 114 extending along a side-to-side orientation (e.g., lateral orientation) and substantially perpendicular to the longitudinal axis 112. Furthermore, a vertical axis 116 may extend top-to-bottom and perpendicular to the longitudinal axis 112 and to the lateral axis 114. FIG. 1A also depicts a roll action 118, which indicates the vehicle 100 may bank from side-to-side, as well as a pitch action 120 indicating the front end 104 may dip forward and/or the rear end 106 may dip rearward.

In one example, the vehicle 100 is a bidirectional vehicle having a first drive module positioned in the front end 104 and a second drive module positioned in the rear end 106. As used herein, a bidirectional vehicle is one that is configured to switch between traveling in a first direction of the vehicle and a second, opposite, direction of the vehicle. In other words, there is no fixed "front" or "rear" of the vehicle 100. Rather, whichever longitudinal end of the vehicle 100 is leading at the time becomes the "front" and the trailing longitudinal end becomes the "rear." In other examples, the techniques described herein may be applied to vehicles other than bidirectional vehicles. Also, whether or not the vehicle is bidirectional, the first drive and second drive modules may be different from one another. For example, one drive module may have a subset of the features of the other drive module. In one such example, the first module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In various instances, the wheels positioned in the front end 104 are steerable, and the wheels positioned in the rear end 106 are also steerable, such that the vehicle 100 includes four-wheel steering (e.g., including each set of wheels having the respective steering components). In other examples, the drive modules may have one or more distinct or mutually exclusive vehicle systems (e.g., one drive module has an HVAC system and the other drive module has a drive motor). As another non-limiting example of such, one module may have an HVAC system while the other drive module has a newer HVAC system having a higher efficiency.

In addition, the vehicle 100 may include sensors 122a-122d, each of which includes a respective field of view (e.g., FOV 123 of sensor 122b). Each of the sensors 122a-122d may include a perception sensor, including a sensor capturing data of an environment around the vehicle 100 (e.g., lidar, camera, time-of-flight, sonar, radar, etc.). As described in other portions of this disclosure, reliable sensor data (e.g., data provided by the sensors 122a-122d about the environment) is important to safe and reliable vehicle operations.

Various components may contribute to using ball joint sensors to determine different conditions and parameters relevant to the vehicle 100 (e.g., relevant to the operation of the sensors 122a-122d). In one aspect of the disclosure, the vehicle 100 includes a first sensor 126a, a second sensor 126b, a third sensor 126c, and a fourth sensor 126d, each of which may be a same type or modality of sensor (may be referred to as "Type A" sensor). In one aspect of the disclosure, each of the sensors 126a-126d may be a ball joint sensor that provides (e.g., detects, measures, outputs, stores, etc.) a measure of articulation (e.g., articulation angle) of a ball joint, which articulates when a suspension assembly of a vehicle moves (e.g., is displaced) along a suspension displacement axis 146a (e.g., kingpin axis) and relative to a chassis of the vehicle. That is, the ball joint may include a ball and ball stud that are coupled to a first part of the suspension assembly (e.g., chassis portion) and a ball socket arranged in a second part (e.g., lower control arm) of the suspension assembly that moves relative to the first part (e.g., when the lower control arm moves relative to the vehicle chassis). In some examples, the ball joint sensor includes a Hall effect sensor that is arranged in the ball socket and that detects the articulation measure of the ball stud when the lower control arm moves relative to the chassis. Furthermore, as depicted in FIG. 1A, a ball stud may include a ball-stud axis 127, and in one aspect of this disclosure, the ball-stud axis 127 is offset and/or not aligned with, the suspension displacement axis 146a (e.g., kingpin axis). Accordingly, techniques described in this disclosure include determining a ride height when these axes are not aligned. Each of the sensors 126a-126d is generically depicted in FIGS. 1A, 1B, and 1C in a general vicinity near which the sensor may be positioned (e.g., in a respective quarter or quadrant of the vehicle, as part of a respective independent suspension assembly or tire assembly, etc.), and the respective position and form of each sensor may change in accordance with various aspects of this disclosure.

In a further aspect, the data provided by the ball joint sensor may be used to determine a ride height above the ground plane 102 (e.g., a suspension displacement value) of a respective portion (e.g., corner, quadrant, side, etc.) of the vehicle. For example, referring to FIG. 1B, the sensor 126a may provide ride-height data for determining a ride height 128a, which quantifies a distance between the ground plane 102 and a respective reference point on the vehicle 100 (e.g., some calibrated position on the vehicle 100 associated with the first sensor 126a). The second sensor 126b may also provide respective ride-height data for determining a respective ride height 128b quantifying a distance between the ground plane 102 and a reference point associated with the second sensor 126b. The third sensor 126c and the fourth sensor 126d (e.g., FIGS. 1A and 1C) may each provide a similar respective ride-height measurement or data.

In a further aspect of this disclosure, the sensors 126a-126d may be collectively used to determine a vehicle roll/pitch plane 130. For instance, each of the sensors 126a-126d may provide respective ride-height data (e.g., for determining ride height above the ground plane 102 at a respective corner, quadrant, or region of the vehicle 100), each ride height corresponding to a reference point on the vehicle 100. Once the position of each reference point is determined from the ride-height data, the roll/pitch plane 130 may be determined. Furthermore, as updated ride-height data is provided by each of the sensors 126a-126d (e.g., as the vehicle maneuvers), changes in the roll/pitch plane 130 may be used to monitor a degree of roll or a degree of pitch experienced by the vehicle 100. In some instances, the vehicle roll 118 or the vehicle pitch 120 may affect the sensors 122a-122d (e.g., by affecting a FOV), and as such, by monitoring the vehicle roll 118 and the vehicle pitch 120, the sensors 126a-126d may contribute to monitoring operations of the sensors 122a-122d.

The roll/pitch plane 130 may be generated using data from all four of the sensors 126a-126d. In other aspects, the roll/pitch plane 130 may be generated using data (e.g., respective ride height) from three of the sensors. For example, if one of the sensors 126a-126d fails, then a roll/pitch plane may still be determined using the other three non-failing sensors. That is, if the fourth sensor 126d fails, then a plane may still be created using data from the first sensor 126a, the second sensor 126b, and the third sensor 126c; if the third sensor 126c fails, then a plane may still be created using data from the first sensor 126a, the second sensor 126b, and the fourth sensor 126d; if the second sensor 126b fails, then a plane may still be created using data from the first sensor 126a, the third sensor 126c, and the fourth sensor 126d; and if the first sensor 126a fails, then a plane may still be created using data from the second sensor 126b, the third sensor 126c, and the fourth sensor 126d.

As indicated above, the roll 118 and the pitch 120 may affect the sensors 122a-122d, and as such, some policies, guidelines, regulations, and the like, may set forth one or more limitations related to roll and pitch (e.g., amount and duration) to reduce potential changes in sensor functionality (e.g., perception). For example, compliance with ASIL D may provide a goal of preventing roll 118 or pitch 120 above a threshold amount for longer than a duration. As such, using the roll/pitch plane 130 to monitor the roll 118 and the pitch 120 may increase a likelihood of compliance with these policies, guidelines, regulations, etc. Although the roll/pitch plane 130 may be generated using only three sensors (e.g., in the event one of the sensors fails), additional backup or redundancy may further reduce a likelihood of failure (e.g., estimated failure rate) to meet a given goal. As such, in another aspect of this disclosure, the vehicle 100 may include a fifth sensor 132a, a sixth sensor 132b, a seventh sensor 132c, and an eighth sensor 132d, each of which may be a same type or modality of sensor (e.g., "Type B" sensor), which is different from the sensor type of the sensors 126a-126d. For example, each of the sensors 132a-132d may be a chassis position sensor (CPS), which provides (e.g., detects, measures, stores, outputs, etc.) an angle (or change in angle) between linkages connecting a lower control arm of a suspension assembly to the vehicle chassis. In other aspects, the sensors 132a-132d may include other types of sensors, such as lidar sensors, cameras, time-of-flight sensors, inertial measurement unit (IMU) sensors, strut extension sensor, and the like, which may be used to determine vehicle ride height for at least a portion of the vehicle. Each of the sensors 132a-132d is generically depicted in FIGS. 1A, 1B, and 1C in a general vicinity near which the sensor may be positioned (e.g., in a respective quarter or quadrant of the vehicle, as part of a respective independent suspension assembly or tire assembly, etc.), and the respective position and form of each sensor may change in accordance with various aspects of this disclosure. Aspects of the disclosure, e.g., regarding roll, pitch, or vehicle orientation using disclosed sensors (126a-126d) can be used to orient other sensors (e.g., sensors 132a-132d). For example, a LIDAR or other sensor may be mounted to a vehicle and the LIDAR's output may be transformed or the LIDAR sensor otherwise calibrated via use of relation to a detected roll, pitch, or orientation of a vehicle to which the LIDAR sensor is mounted to.

In examples, data (e.g., linkage angle or change in linkage angle) provided by the sensors 132a-132d may be used to determine respective ride heights, which may be used to generate another roll/pitch plane 134 (e.g., using Type B sensor(s)). For reference and clarity in this description, the roll-pitch plane 130 may be referred to as a "first roll/pitch plane" or a "Type A sensor roll/pitch plane" or a ball joint-sensor roll/pitch plane," whereas the roll/pitch plane 134 may be referred to as a "second roll/pitch plane 134" or a "Type B sensor roll/pitch plane" or a "CPS roll/pitch plane." Similar to the first roll/pitch plane 130, the second roll/pitch plane 134 may also be used to monitor the vehicle roll 118 and the vehicle pitch 120. For example, the data provided by each of the sensors 132a-132d may be used to determine a respective ride height above the ground plane 102. Referring to FIG. 1B, the sensor 132a may provide ride-height data for determining a ride height 136a, which quantifies a distance between the ground plane 102 and a respective reference point on the vehicle 100 (e.g., some calibrated position on the vehicle 100 associated with the fifth sensor 132a). The sixth sensor 132b may also provide respective ride-height data for determining a respective ride height 136b quantifying a distance between the ground plane 102 and a reference point associated with the sixth sensor 132b. The seventh sensor 132c and the eighth sensor 132d (e.g., FIGS. 1A and 1C) may each provide a similar respective ride-height measurement or data, which may be used in combination with the ride-height data from the fifth sensor 132a and the sixth sensor 132b to determine the second roll/pitch plane 134

In one aspect of the disclosure, both the first roll/pitch plane 130 and the second roll/pitch plane 134 may be generated and used to independently monitor the vehicle roll 118 and the vehicle pitch 120. In other instances, the first roll/pitch plane 130 may be compared to the second roll/pitch plane 134 to assess a consistency between the planes 130 and 134 and determine reliability. For example, if the planes 130 and 134 are within a threshold offset value (e.g., threshold roll offset or threshold pitch offset relative to one another), then the planes may be deemed reliable for monitoring the roll 118 and the pitch 120 or for controlling vehicle operations. Alternatively, if the planes 130 and 134 are not within a threshold offset value, then one of the planes 130 and 134, or both of the planes 130 and 134, may be deemed unreliable for monitoring or controlling vehicle operations. For example, if one of the sensor modalities, as between the sensors 126a-126d and the sensors 132a-132d, is deemed more reliable (e.g., higher sensitivity, lower failure rate, etc.), then the roll-pitch plane created using data from that more reliable sensor modality may be selected in the event of a discrepancy. In one aspect of the disclosure, if a discrepancy exists between the roll/pitch plane 130 and the roll/pitch plane 134 (e.g., difference between the planes exceeds threshold offset value), then the roll/pitch plane 130 based on ball joint sensor data may be used to control a vehicle operation, instead of the roll/pitch plane 134 based on other sensor data (e.g., CPS).

In another aspect of the disclosure, the sensors 126a-126d and 132a-132d include positions relative to one another. For instance, referring to FIG. 1C, an example of relative positions between the sensors 126a-126d and the sensors 132a-132d is illustrated. In one aspect of the disclosure, each of the sensors 126a-126d is both longitudinally offset (e.g., offset in a direction parallel to the longitudinal axis 112) and laterally offset (e.g., offset in a direction parallel to the lateral axis 114) from each of the sensors 132a-132d. Furthermore, in one example, the vehicle 100 includes an independent suspension assembly for each wheel, such as a Macpherson-style suspension assembly or double wishbone, and each independent suspension assembly is coupled, directly or indirectly, to a sensor of the sensors 126a-126d and a sensor of the sensors 132a-132d. For example, each of the sensors 126a-126d may be a ball joint sensor that detects position data (e.g., articulation angle) of a ball joint. In some instances, the ball joint may include a ball and ball stud that are coupled to a first part of the suspension assembly (e.g., chassis portion) and a ball socket arranged in a second part (e.g., lower control arm) of the suspension assembly that moves relative to the first part (e.g., when the lower control arm moves relative to the vehicle chassis). The ball joint stud may include a neutral position, based on when the vehicle is on a flat surface and all four struts are at a baseline and/or based on some calibration upon vehicle startup. As the vehicle maneuvers (e.g., drives forward or reverse) a difference between a measured position of the ball joint stud and the neutral position of the ball joint stud is indicative of a change in ride height of a respective portion (e.g., corner, wheel, quadrant, etc.) of the vehicle. In certain aspects, the ball joint sensor includes a Hall effect sensor that is arranged in the ball socket and that detects the articulation angle of the ball stud when the lower control arm moves relative to the chassis. As explained above, the data provided by the ball joint sensor may be used to determine ride height associated with that part of the vehicle, which in turn may be used to determine the first roll/pitch plane 130. In a further example, each of the sensors 132a-132d may include a chassis position sensor (CPS) attached to a part of the lower control arm via one or more linkages, which angularly adjust or rotate in response to movement by the lower control arm relative to the vehicle chassis. Each CPS may detect the position or rotation of the linkage(s), which may be used to determine a ride height.

In a further aspect of the disclosure, the positions of the sensors 126a-126d relative to the sensors 132a-132d may allow sensor data to be used in various manners and may provide backup systems, redundancy, and/or reduce a likelihood of failure. For example, in one aspect of the disclosure, data from one sensor type (e.g., ride height generated from at least one ball joint sensor data) may be combined with data from a different sensor type (e.g., ride height from at least one CPS) to determine a roll/pitch plane, as long as three different ride heights are determined that can be converted to a common coordinate system (e.g., using the known respective calibrated reference points). Because the sensors 126a-126d are both longitudinally and laterally offset from the sensors 132a-132d, a roll-pitch plane may be generated. As such, when both systems of sensors are redundantly used, a roll/pitch plane may still be determined when as many as five sensors fail, provided at least three ride heights can still be determined. For example, if sensors 126a-c, 132a, and 132c fail, then a roll/pitch plane may still be generated using ride-height data provided by the sensors 126d, 132b, and 132d. Among other things, this redundancy may contribute to increased accuracy, as well as system reliability.

The sensors 126a-126d and the sensors 132a-132d may be configured in one or more networks facilitating the use of sensor data in various manners. For example, referring to FIG. 1C, each of the fifth sensor 132a and the seventh sensor 132c may communicate with a first active suspension controller (ASC1), and each of the sixth sensor 132b and the eighth sensor 132d may communicate with a second active suspension controller (ASC2) 152. Furthermore, each of the ASC1 150 and the ASC2 152 may communicate (e.g., via a controller area network (CAN) link) with an executive motion unit (EMU) 154. In a further example, each of the sensors 126*a*-126*d* may be configured in a network and communicate as part of a backup motion unit (BMU) 156, which may also communicate with the EMU 154 via a CAN link.

In some instances, the sensors 126*a*-126*d* may detect ball joint articulation resulting from variables other than suspension displacement (e.g., damper stroke) along a suspension displacement axis (e.g., 146*a* and 146*b*). Referring to FIGS. 1A and 1C, in another aspect of the disclosure, the vehicle 100 includes steering components including a steering motor 138 and a steering rack 140. For example, the steering motor 138 may generate a rotational output 142 that is transferred to the steering rack 140 to create linear steering rack travel 144 in one direction or another. The steering rack 140 may interface with the independent suspension assembly via a knuckle (e.g., 145 in FIG. 1A) or some other coupling that transfers the linear rack travel 144 to the wheel to cause the wheel to pivot or rotate about a steering axis (e.g., 147 in FIG. 1A), which may include a steering ball joint axis or other steering knuckle axis. Each wheel may pivot or rotate about a respective axis. In one aspect of the disclosure, as depicted in FIG. 1A, the suspension displacement axis (e.g., 146*a* such as a kingpin axis) may be offset from the steering axis (e.g., 147), and techniques are described for determining displacement value(s) and estimated steering data when these axes are offset or otherwise not aligned.

In FIGS. 1A and 1C, a steering assembly is depicted in the front end 104 of the vehicle. In other aspects, a similar steering assembly may also be positioned in the rear end 106 of the vehicle. The steering motor 138 may receive steering input (e.g., direction and amount) from a manually operated steering wheel (not shown), from a computing device, or from a combination thereof. Furthermore, each of the suspension assemblies in the rear end 106 of the vehicle 100 includes a respective suspension displacement axis, such as schematically depicted in FIG. 1C by elements 146*c* and 146*d*. Each of the rear axes 146*c* and 146*d* may interface with rear steering components (if provided), as well as provide a respective suspension displacement axis along which the independent suspension assembly travels when adjusting from one ride height to a different ride height.

In one aspect of the disclosure, a suspension displacement (e.g., change in ride height, damper stroke, etc.) along the suspension displacement axis (e.g., 146*a*) causes the ball stud to articulate (e.g., angularly adjust or pivot in the socket), which is detected by the ball-stud sensor. For example, a change in ride height along the suspension displacement axis 146*a* causes the ball stud having a ball-stud axis 127 to articulate (e.g., angularly adjust or pivot in the socket), which is detected by the ball-stud sensor 126*a*. In a further aspect of the present disclosure, in each suspension assembly, the axes 146*a*-*d* may be misaligned with the ball-stud axis (e.g., axis 127 in FIG. 1A) and the steering axes (e.g., 147), such that the ball stud articulates in response to a steering input (e.g., rotate left or right) applied by the steering rack 140 (e.g., to the knuckle or other suspension component interfacing with the steering rack). As such, the ball-stud sensor 126*a* may also detect ball-stud articulations caused by steering, independently of damper travel or changes in ride height. The steering components disclosed with respect to FIGS. 1A and 1C include one steering arrangement including a steering rack. Alternative aspects of the disclosure may include a different steering arrangement. For example, each suspension assembly may include a respective steering motor that, without a shared or common steering rack, affects the command angle of a wheel (e.g., by rotating about a steering axis). As such, the steering motor rotation may affect the wheel command angle without relying on the shared or common steering rack. In arrangements including a misaligned and/or offset ball stud axis, suspension displacement axis, and steering axis, rotation at the knuckle directly caused by a steering motor (e.g., without using a steering rack) will similarly affect the ball-stud sensor as described above. As such, one aspect of the disclosure includes a three-dimensional (3D) map or other data structure storing relationships between the steering rack travel (or other steering sensor data, such as motor rotation), ball-stud articulation, and suspension displacement.

Referring to FIG. 2, an example 3D plot of data on a graph 210 illustrates suspension displacement (e.g., damper stroke) or travel along the x-axis 212 and ball-stud articulation angle along the y-axis 214. For example, displacement (e.g., damper stroke) in one direction (e.g., away from a ground plane) may be represented by positive values, whereas suspension displacement (e.g., damper stroke) in the opposite direction (e.g., toward the ground plane) may be represented by negative values. In addition, along the y-axis 214, articulation or angular adjustment of the ball stud in one direction (e.g., forward) may be represented by positive values, whereas articulation or angular adjustment in the opposite direction (e.g., rearward) may be represented by negative values. In addition, each of the data lines 216*a*-*c* depicted on the graph 210 represents a different steering rack travel magnitude and direction (e.g., positive values may represent travel to the right whereas negative values may represent travel to the left). As such, the graph 210 illustrates how the articulation angle of the ball stud along the y-axis 214 varies as a function of both suspension displacement (x-axis 212) and steering rack travel. If two of the variables are known, then the third variable may be determined. For example, if the articulation angle is about 6 degrees and the steering rack travel is about 0.6 mm, then based on a position 218 marked on the graph 210 (e.g., identifying the intersection of the known data), the estimated displacement value (e.g., damper stroke or travel) is about 25 mm.

In one aspect of the disclosure, a mathematical relationship may exist between the variables. For example, for a given rack travel, a linear or other function may define a relationship between displacement and articulation angle. Referring to FIG. 2, in one example, where the steering rack travel is −63 mm (e.g., 216*a*), the relationship between displacement and articulation angle may be defined by the linear function $y=0.1621x+2.8921$. In another example, where the steering rack travel is about 0.6 mm (e.g., 216*b*), the relationship between displacement and articulation angle may be defined by the linear function $y=0.1634x+0.0495$. In yet a further example, where the steering rack travel is about 63 mm (e.g., 216*c*), the relationship between displacement and articulation angle may be defined by the linear function $y=0.1646x-2.2302$. The data illustrated in FIG. 2 is one example, and in other aspects of this disclosure, the 3D data may include additional data representing other rack travels, displacement values, and articulation angles. In addition, in other aspects, the data may have different values, depending on the relative geometries, positions, and interactions between the various sensors and vehicle control components. For example, as explained in other parts of this disclosure, each independent suspension assembly may include a steering motor, and a rotation of the steering motor may cause a wheel to rotate about the kingpin axis without steering rack displacement. As such, in another aspect of the disclosure, the data lines (e.g., 216a, 216b, and 216c) may be based on a motor rotation value (e.g., degree of rotation in a direction), instead of, or in addition to, a linear rack travel distance.

As indicated above, suspension displacement (e.g., estimated displacement value) based on the articulation angle and the steering rack travel may be used for various purposes. For example, a suspension displacement (e.g., associated with ride height) may be determined for at least three suspension assemblies (based on the ball joint sensor data and steering data for each) and combined to determine a roll/pitch plane. This roll/pitch plane based on ball joint sensor data may be compared to a roll/pitch plane based on other sensors (e.g., CPS) to assess reliability. In addition, a suspension displacement based on ball joint sensor data may be combined with at least two other suspension displacements, each of which may be based on either ball joint sensor data or some other sensor data, to determine a roll/pitch plane.

In examples, the present disclosure includes techniques for estimating steering data (e.g., estimated steering rack travel or estimated rack travel distance or estimated steering motor rotation) based on output (e.g., articulation angle) of the ball joint sensor. For example, with a given ride height (e.g., suspension-displacement value, damper travel, or other suspension position or state as determined by another sensor, such as a chassis position sensor) and a detected articulation angle (e.g., determined from output of the ball joint sensor), steering data may be estimated (e.g., estimated rack travel and/or estimated steering motor rotation). In one aspect of the disclosure, the given suspension displacement value is based on data from a source other than the sensors 126a-126d. For example, a suspension displacement value may be determined from data provided by the sensors 132a-132d. That is, for the front right suspension assembly, the ball joint sensor 126a may provide an articulation angle, and data from the sensor 132a (e.g., CPS) may be used to determine a suspension displacement value. In one aspect, the displacement (e.g., ride height) may be determined using data from a CPS. In other aspects, other sensors may be used to provide the suspension displacement or ride height, such as a lidar sensor, camera, IMU, or other sensor providing perception data. These other sensors may include a position that generally corresponds with the sensors 132a-132d or may include an alternative position located somewhere else on the vehicle. With these data points (e.g., suspension displacement and articulation angle), an estimated steering rack travel may be determined. For example, referring to FIG. 2, if the sensor 126a provides a ball joint articulation angle of about −4 degrees, and a suspension displacement of about 17 mm is determined from data (e.g., provided by the sensor 132a), then an estimated steering rack travel of about 63 mm may be determined, as indicated at point 220 identified on the chart 210.

In some instances, the estimated steering data (e.g., determined from the 3D data) may be used to monitor operations of the vehicle (e.g., motion along a trajectory). In other aspects, the estimated steering data may be compared to steering sensor data from a steering sensor to assess the reliability of the steering sensor data. For example, a steering sensor may provide (e.g., detect, measure, etc.) a value (e.g., degrees of rotation) quantifying the rotation 142 of the steering motor 138, and the rotation value may be converted to steering sensor rack travel data. The steering sensor rack travel data may be compared to the estimated rack travel (e.g., determined from the suspension displacement and ball joint output) to assess consistency. In addition, or alternatively, the estimated steering data (e.g., determined from the 3D data) may be converted to an estimated motor rotation value or estimated rotation value, which may then be compared to the steering sensor rotation value to assess consistency. In some examples, if the data consistency between the estimated data and the steering sensor data is above a threshold, then the data may be deemed reliable for use by other operations, whereas data consistency below a threshold may suggest a deficiency or failure in the steering system (e.g., belt coupling steering motor to steering rack not providing intended correlation between motor rotation and steering rack travel). In additional examples, the data may be combined (e.g., average rack travel), and the combined rack travel data may be relied on by other operations.

Figure 3:
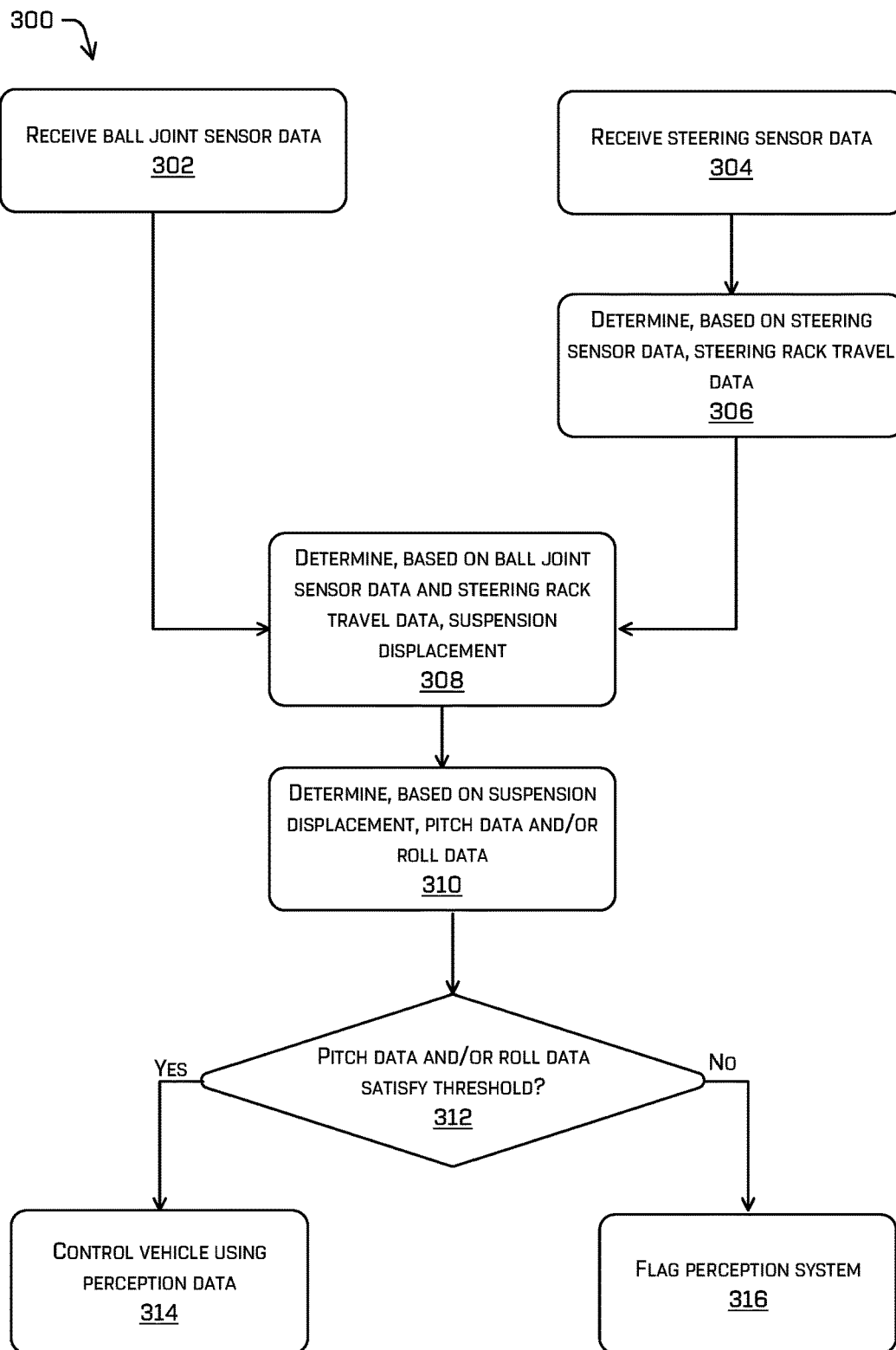
FIG. 3 includes a flow diagram illustrating processes for determining, based on data from a ball joint sensor, vehicle ride height, which may be used to control vehicle operations, as described herein.
Figure 4:
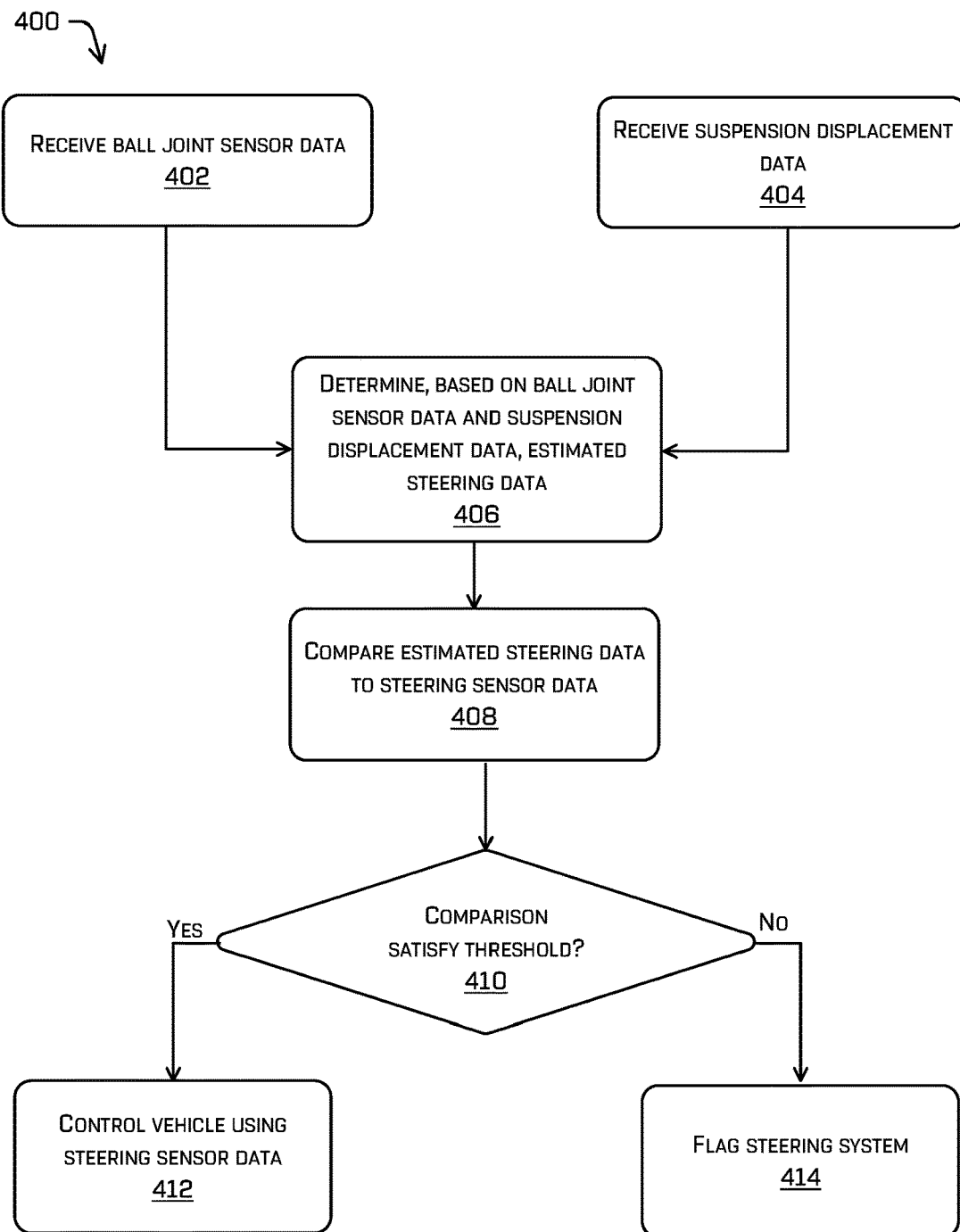
FIG. 4 includes a flow diagram illustrating processes for determining estimated steering data as described herein.

FIGS. 3 and 4 are flowcharts showing example processes involving techniques as described herein. The processes illustrated in FIGS. 3 and 4 may be described with reference to components and elements described above with reference to FIGS. 1A, 1B, 1C, and 2 for convenience and ease of understanding. However, the processes illustrated in FIGS. 3 and 4 are not limited to being performed using these components, and the components are not limited to performing the processes illustrated in FIGS. 3 and 4. These process are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

Referring now to FIG. 3, FIG. 3 includes a flow diagram with operations or steps for a method 300 for using ball joint sensor data to determine a condition of a vehicle. The method 300 includes, at 302, receiving ball joint sensor data, which is associated with an articulation angle of a ball joint. In one aspect, the ball joint articulates when a suspension assembly of at least a portion of a vehicle moves relative to a chassis of the vehicle For example, ball joint sensor data may be received from the ball joint sensor 126a, and the ball joint sensor data may be associated with an articulation measure (e.g., angle) of a ball joint coupled to the front right suspension assembly of the vehicle 100. In one example, the raw sensor data from the ball joint sensor may be a voltage or current measurement, which may be used to determine an articulation angle in a direction (e.g., forward or rearward).

The method 300 includes, at 304 receiving steering sensor data. For example, a steering motor rotation value associated with the amount of rotation 142 of the steering motor 138 may be received. Similar to the ball joint sensor data, the steering sensor data may be a voltage or current measurement, which may be used to determine a rotational value (e.g., right or left, clockwise or counterclockwise, etc.).

In a further aspect, at 306, the method includes determining, based on the steering sensor data, steering rack travel data. For example, the steering rack travel 144 (e.g., linear distance and direction) may be determined based on the steering motor rotation value provided by a steering motor sensor.

The method includes, at 308, determining, based the ball joint sensor data and on steering rack travel data, a suspension displacement (e.g., ride height) at a portion of the vehicle (e.g., the quadrant or corner or suspension assembly of the ball joint sensor). For example, the ball joint sensor data may be used to determine an articulation angle and articulation direction of the ball joint. Based on the articulation angle and direction and on the steering rack travel distance and direction, suspension displacement may be determined, such as by referencing the 3D plot illustrated by the graph 210 or the mathematical relationships represented by the 3D plot.

The method 300 further includes, at 310, determining, based on the suspension displacement, pitch data and/or roll data. For example, if the ball joint sensor data in 302 is from the sensor 126*a*, then a suspension displacement (e.g., ride height) may be determined for two or more additional portions of the vehicle 100 (e.g., three or more portions altogether), based on two or more of the sensors 126*b*-126*d*, and the collective three or more suspension displacement values may be used to generate a roll/pitch plane 130. One or more other roll/pitch planes (e.g., 134) may also be generated using other data (e.g., CPS data, perception data, etc.).

In a further example, the method 300 includes, at 312 determining whether the pitch data and/or the roll data satisfies a threshold. For instance, the roll/pitch plane 130 based on data from the ball joint sensors 126*a*-126*d* may be compared to a roll/pitch plane based on data from other sources to determine an offset value. The offset value may be compared to an offset threshold to determine whether the difference between the pitch data and/or roll data is below the threshold. A result of the comparison at 312 may be used to determine how sensor data is processed or treated from one or more sensors (e.g., lidar sensor, camera sensor, time-of-flight sensor, sonar sensor, etc.) of a perception system. If the threshold is satisfied (e.g., the offset value is equal to or less than the threshold), then at 314, perception data from a perception sensor (e.g., the validity of which at least partially relies on accurate roll data and/or pitch data) may be used to control vehicle operations. Alternatively, if the threshold is not satisfied (e.g., the offset value is greater than the offset threshold), then at 316, an error message may be generated flagging at least a portion of a perception system, since pitch data and/or roll data relied on by the sensor system may not be reliable.

Referring now to FIG. 4, FIG. 4 includes a flow diagram with operations or steps for a method 400 for using ball joint sensor data to determine a condition of a vehicle. The method 400 includes, at 402, receiving ball joint sensor data, which is associated with an articulation angle of a ball joint. In one aspect, the ball joint articulates when a suspension assembly of at least a portion of a vehicle moves relative to a chassis of the vehicle For example, ball joint sensor data may be received from the ball joint sensor 126*a*, and the ball joint sensor data may be associated with an articulation measure (e.g., angle) of a ball joint coupled to the front right suspension assembly of the vehicle 100. In one example, the raw sensor data from the ball joint sensor may be a voltage or current measurement, which may be used to determine an articulation angle in a direction (e.g., forward or rearward).

The method 400 includes, at 404 receiving suspension displacement data. For example, suspension displacement data (e.g., ride height data, strut extension data, etc.) may be received from a sensor 132*a* (e.g., CPS), and the suspension displacement data may provide, or be used to determine, a linear displacement value (e.g., damper stroke).

In a further aspect, at 406, the method includes determining, based the ball joint sensor data and on suspension displacement data, estimated steering data (e.g., linear rack travel). For example, the ball joint sensor data may be used to determine an articulation angle and articulation direction of the ball joint. Based on the articulation angle and direction and on the suspension displacement amount and direction, estimated steering may be determined, such as by referencing the 3D plot illustrated by the graph 210 or the mathematical relationships represented by the 3D plot. The estimated steering data may include the estimated steering rack travel based on the referenced correlation data and/or may include an estimated motor rotation value determined from the estimated steering rack travel.

The method 400 further includes, at 408, comparing the estimated steering data to steering sensor data. For example, the estimated rack travel data may be compared to steering sensor rack travel data, which is based on the steering sensor rotational data. Alternatively, the estimated motor rotation value, which is based on the estimated rack travel data, may be compared to the steering sensor rotational data. In some aspects, this operation at 408 may be optional, and the method may alternatively flow from 406 (e.g., determining estimated steering data) to controlling, based on the estimated steering data, an operation of a vehicle.

In a further example, the method 400 includes, at 410 determining whether the comparison of the estimated steering data to the steering sensor data satisfies a threshold. For instance, a variance or difference may be determined between the estimated steering data and the steering sensor data. The variance may be compared to a threshold to determine whether the difference between estimated steering data and steering sensor data is below the threshold. A result of the comparison at 410 may be used to determine how sensor data is processed or treated from one or more sensors (e.g., the steering motor sensor). If the threshold is satisfied (e.g., the variance is equal to or less than the threshold), then at 412, steering data from the steering motor sensor may be used to control vehicle operations, such as by determining a steering angle of the vehicle. Alternatively, if the threshold is not satisfied (e.g., the variance is greater than the threshold), then at 414, an error message may be generated flagging at least a portion of the steering system.

Figure 5:
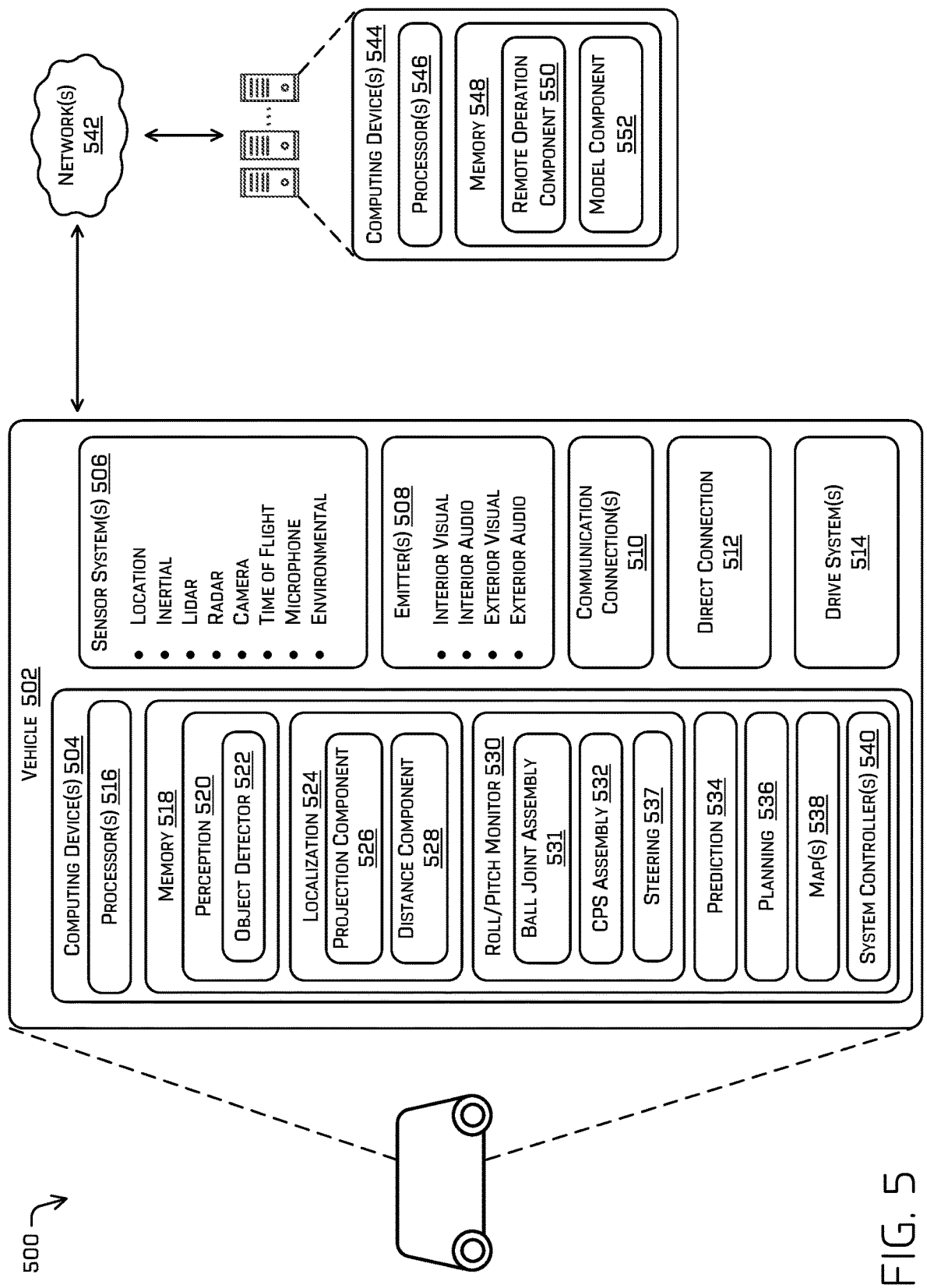
FIG. 5 is a block diagram illustrating an example system for performing techniques as described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle. The vehicle 502 may be the vehicle 100 depicted in FIGS. 1A, 1B, and 1C.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506). The drive system(s) 514 may also include one or more steering motors (e.g., 140), steering motor sensors, and steering racks (e.g., 140).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520, a localization component 524, a roll/pitch monitor 530, a prediction component 534, a planning component 536, a maps component 538, and one or more system controller(s) 540. Though depicted as residing in the memory 518 for illustrative purposes, it is contemplated that the perception component 520, the localization component 524, the roll/pitch monitor 530, the prediction component 534, the planning component 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In one example, the perception component 520 may detect a ground surface and determine a ride height based on sensor data.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment, which may be used to determine information about an environment.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

The localization component 524 can include functionality to receive data from the sensor system(s) 506 and/or other components to determine a position of the vehicle 502. For example, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory or for initial calibration.

The roll/pitch monitor 530 may determine initial roll/pitch information related to the vehicle 502, which may be used to generate an initial roll/pitch plane (e.g., upon vehicle start up). For example, the roll/pitch monitor 530 includes a ball joint assembly 531 and a CPS (chassis position sensor) assembly 532 that may provide at least three ride heights at various portions of the vehicle, and the roll/pitch monitor 530 may use the at least three ride heights to determine the initial roll/pitch plane. The roll/pitch monitor 530 may further determine one or more additional roll/pitch planes based on data from the ball joint assembly 531 and/or the CPS assembly 532. The roll/pitch monitor 530 may compare the roll/pitch planes to determine when roll/pitch parameters (e.g., amount, duration, etc.) exceed a threshold notify other components accordingly. For example, the roll/pitch monitor 530 may notify the perception component 520 when roll/pitch parameters exceed a threshold, since roll/pitch changes may affect sensor field of view or other perception variables. The roll/pitch monitor 530 may also execute other operations described in this disclosure, including those described with respect to FIGS. 1A, 1B, 1C, and 2-4. The roll/pitch monitor 530 may be an independent component or may be part of the perception component 520 and/or part of the localization component 524.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 536 can determine a path for the vehicle 502 to follow to traverse through an environment. For example, the planning component 536 can determine various routes and paths and various levels of detail. In some instances, the planning component 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 536 can alternatively, or additionally, use data from the perception component 520 and/or the prediction component 534 to determine a path for the vehicle 502 to follow to traverse through an environment. For example, the planning component 536 can receive data from the perception component 520 and/or the prediction component 534 regarding objects associated with an environment. Using this data, the planning component 536 can determine a route to travel from a first location (e.g., a current location) to a second location (e.g., a target location) to avoid objects in an environment. In at least some examples, such a planning component 536 may determine there is no such collision free path and, in turn, provide a path which brings vehicle 502 to a safe stop avoiding all collisions and/or otherwise mitigating damage.

The planning component 536 may interface with a steering component 537 for determining steering data, such as a rack travel distance, steering motor rotation, etc. In some instances, the steering component 537 may communicate with the roll/pitch monitor 530 to exchange data (e.g., articulation angle, displacement, estimated rack travel, etc.). For example, the steering component 537 may receive an articulation angle and a suspension displacement from the roll/pitch monitor 530 and may determine estimated steering data (e.g., estimated rack travel) based on the data. In another example, the steering component 537 may determine, based on steering motor rotation data, a rack travel and communicate the rack travel to the roll/pitch monitor 530, which may use the rack travel and an articulation angle to determine a suspension displacement.

The memory 518 can further include one or more maps 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like).

In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 538 can include at least one map (e.g., images and/or a mesh). In some examples, the vehicle 502 can be controlled based at least in part on the map(s) 538. That is, the map(s) 538 can be used in connection with the perception component 520 (and sub-components), the localization component 528 (and sub-components), the prediction component 534, and/or the planning component 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planning component 536.

The vehicle 502 can connect to computing device(s) 544 via network 542 and can include one or more processor(s) 556 and memory 548 communicatively coupled with the one or more processor(s) 556. In at least one instance, the one or more processor(s) 556 can be similar to the processor(s) 516 and the memory 548 can be similar to the memory 518. In the illustrated example, the memory 548 of the computing device(s) 544 stores a remote operation component 550 and/or a model component 552. In at least one instance, the model component 552, after empirical testing and/or simulations, can include the models for determining a location and/or determining a calibration parameter, as discussed herein. Though depicted as residing in the memory 548 for illustrative purposes, it is contemplated that the remote operation component 550 and the model component 552 can additionally, or alternatively, be accessible to the computing device(s) 544 (e.g., stored in a different component of computing device(s) 544 and/or be accessible to the computing device(s) 544 (e.g., stored remotely).

As discussed herein, the remote operation component 550 can include functionality to receive an indication of calibration parameter(s), sensor data associated with such calibration parameter(s), and/or a request for preventative maintenance. In some examples, the remote operation component 550 can schedule a maintenance operation based on a calibration parameter or a determination by the vehicle 502 that a calibration parameter is indicative of a degraded state (e.g., when steering data is inconsistent with estimated steering data). In some examples, a remote operation component 550 can include teleoperators or operators who can control the vehicle 502 or can provide instructions to the vehicle based on a calibration parameter.

The model component 552 can include functionality to generate models for determining a location and/or determine a calibration parameter, as discussed herein. For example, the model component 552 can receive sensor data and can determine calibration parameter(s) associated with such sensor data. The model component 552 can aggregate data across a plurality of vehicles (e.g., a fleet of vehicles) to determine calibration parameters indicative of normal operations and calibration parameters indicative of degraded operations. Further, the model component 552 can associate calibration parameter s with a time period of operating a sensor and a performance of components associated with such metrics to determine a predictive maintenance schedule associated with various sensors, as discussed herein.

The processor(s) 516 of the computing device 504 and the processor(s) 556 of the computing device(s) 544 can be any suitable processor capable of executing instructions to process data and perform operations as described herein. By way of example and not limitation, the processor(s) 516 and 556 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 544 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network. In some examples an a machine learned model could be trained to determine a roll data, pitch data, a roll/pitch plane, estimated steering data, or other condition of the vehicle based on sensor data received from the ball joint sensors, CPS sensors, and/or other sensor data.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As described above with reference to FIGS. 1-5, techniques described herein can be useful for using ball joint sensor data to determine various conditions and parameters relevant to a vehicle are described in this disclosure. For example, ball joint sensor data may be used to determine suspension displacement, which may be used to determine pitch data or roll data. In addition, ball joint sensor data may be used to determine estimated steering data. The estimated steering data may be used to assess the reliability of steering sensor data or may be used to monitor vehicle operations (e.g., travel along a trajectory).

EXAMPLE CLAUSES

Clause A: A system comprising: one or more processors; and one or more non-transitory computer-readable media storing instructions executable by the one or more processors, wherein the instructions, when executed, cause the system to perform operations comprising: receiving first sensor data from a ball joint sensor, the first sensor data being associated with an angle of a ball joint, which articulates when a suspension assembly of a vehicle moves along a displacement axis and relative to a chassis of the vehicle; receiving second sensor data comprising an output associated with a chassis position sensor; determining, based on the output, an estimated displacement value associated with the suspension assembly and the chassis; determining, based on the angle and the estimated displacement value, estimated steering data; receiving steering sensor data; comparing, as a comparison, the estimated steering data to the steering sensor data; and controlling an operation of the vehicle based at least in part on the comparison.

Clause B: The system of clause A, wherein: the steering sensor data comprises a rack travel distance; the estimated steering data is an estimated rack travel distance; and the comparing includes determining whether a difference between the estimated rack travel distance and the rack travel distance is less than or equal to a threshold.

Clause C: The system of clause B, the operations further comprising: receiving steering motor rotation data associated with a steering motor of the vehicle; and determining the rack travel distance based on the steering motor rotation data.

Clause D: The system of any of clauses A-C, wherein at least a portion of the ball joint is offset from the displacement axis.

Clause E: The system of any of clauses A-D, further comprising the chassis position sensor coupled to a lower control arm via one or more linkages, wherein the output is based on a position of the one or more linkages.

Clause F: A method comprising: receiving first sensor data being associated with an angle of a ball joint which articulates when a suspension assembly of a vehicle moves relative to a chassis of the vehicle; receiving second sensor data comprising an estimated displacement value associated with the suspension assembly and the chassis; determining, based on the angle and the estimated displacement value, estimated steering data; and controlling, based at least in part on the estimated steering data, an operation of the vehicle.

G: The method of clause F, further comprising: receiving an output associated with a chassis position sensor; and determining, based on the output, the estimated displacement value.

Clause H: The method of clause G, wherein the output is associated with an angle between linkages connecting a lower control arm of the suspension assembly to the chassis.

Clause I: The method of any of clauses F-H, further comprising: receiving steering sensor data; and comparing, as a comparison, the estimated steering data to the steering sensor data, wherein the controlling the operation is based at least in part on the comparison.

Clause J: The method of any of clauses F-I, wherein: the estimated steering data includes an estimated rack travel distance; and the method further comprises: receiving steering sensor data associated with a rack travel distance; and determining whether a difference between the estimated rack travel distance and the rack travel distance is less than or equal to a threshold.

Clause K: The method of any of clauses F-J, wherein the second sensor data comprises sensor data from at least one of a chassis position sensor, a lidar sensor, a camera, a time-of-flight sensor, and an inertial measurement unit (IMU).

Clause L: The method of any of clauses F-K, wherein: the estimated steering data includes an estimated rotation value; and the method further comprises: receiving steering sensor data associated with a rotation value of a steering motor of the vehicle; and determining whether a difference between the estimated rotation value and the rotation value is equal to or below a threshold.

Clause M: The method of clause L, further comprising: determining, based on the angle and the estimated displacement value an estimated rack travel distance; and determining, based on the estimated rack travel distance, the estimated rotation value.

Clause N: The method of any of clauses F-M, further comprising: receiving steering sensor data; and determining that a difference between the estimated steering data and the steering sensor data is equal to or below a threshold, wherein the controlling the operation of the vehicle includes determining, based on the difference being equal to or below the threshold, a steering angle of the vehicle.

Clause O: One or more non-transitory computer-readable media storing instructions that, when executed, cause one or more processors to perform operations comprising: receiving first sensor data being associated with an angle of a ball joint, which articulates when a suspension assembly of a vehicle moves relative to a chassis of the vehicle; receiving second sensor data comprising an estimated displacement value associated with the suspension assembly and the chassis; determining, based on the angle and the estimated displacement value, estimated steering data; and controlling, based at least in part on the estimated steering data, an operation of the vehicle.

Clause P: The one or more non-transitory computer-readable media of clause O, the operations further comprising: receiving an output associated with a chassis position sensor, wherein the output is associated with an angle between linkages connecting a lower control arm of the suspension assembly to the chassis; and determining, based on the output, the estimated displacement value.

Clause Q: The one or more non-transitory computer-readable media of clause O or P, the operations further comprising: receiving steering sensor data; and comparing, as a comparison, the estimated steering data to the steering sensor data, wherein the controlling the operation is based at least in part on the comparison.

Clause R: The one or more non-transitory computer-readable media of clause Q, wherein: the steering sensor data comprises a rack travel distance; the estimated steering data is an estimated rack travel distance; and the comparing includes determining whether a difference between the estimated rack travel distance and the rack travel distance satisfies a threshold.

Clause S: The one or more non-transitory computer-readable media of clause R, the operations further comprising: receiving steering motor rotation data associated with a steering motor of the vehicle; and determining the rack travel distance based on the steering motor rotation data.

Clause T: The one or more non-transitory computer-readable media of any of clauses Q-S, wherein: the steering sensor data comprises a rotation value associated with a steering motor of the vehicle; the estimated steering data is an estimated rotation value; and the comparing includes determining whether a difference between the estimated rotation value and the rotation value satisfies a threshold.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving first sensor data from a ball joint sensor, the first sensor data being associated with an angle of a ball joint, which articulates when a suspension assembly of a vehicle moves along a displacement axis and relative to a chassis of the vehicle, the ball joint sensor comprising at least one of a hall effect sensor, a magnetic pickup, an optical sensor, or a potentiometer arranged in a ball socket of the ball joint;
receiving second sensor data comprising an output associated with a chassis position sensor;
determining, based on the output, an estimated displacement value associated with the suspension assembly and the chassis, wherein the estimated displacement value is a measure of a distance between a ground plane and a reference point on the vehicle;
determining, based on the angle and the estimated displacement value, estimated steering data;
receiving steering sensor data;
comparing, as a comparison, the estimated steering data to the steering sensor data; and
controlling an operation of the vehicle based at least in part on the comparison.

2. The system of claim 1, wherein:
the steering sensor data comprises a rack travel distance;
the estimated steering data is an estimated rack travel distance; and
the comparing includes determining whether a difference between the estimated rack travel distance and the rack travel distance is less than or equal to a threshold.

3. The system of claim 2, the operations further comprising:
receiving steering motor rotation data associated with a steering motor of the vehicle; and
determining the rack travel distance based on the steering motor rotation data.

4. The system of claim 1, wherein at least a portion of the ball joint is offset from the displacement axis.

5. The system of claim 1, further comprising the chassis position sensor coupled to a lower control arm via one or more linkages, wherein the output is based on a position of the one or more linkages.

6. A method comprising:
receiving, from a ball joint sensor, first sensor data being associated with an angle of a ball joint which articulates when a suspension assembly of a vehicle moves relative to a chassis of the vehicle, the ball joint sensor comprising at least one of a hall effect sensor, a magnetic pickup, an optical sensor, or a potentiometer arranged in a ball socket of the ball joint;
receiving second sensor data comprising an estimated displacement value associated with the suspension assembly and the chassis, wherein the estimated displacement value is a measure of a distance between a ground plane and a reference point on the vehicle;
determining, based on the angle and the estimated displacement value, estimated steering data; and
controlling, based at least in part on the estimated steering data, an operation of the vehicle.

7. The method of claim 6, further comprising:
receiving an output associated with a chassis position sensor; and
determining, based on the output, the estimated displacement value.

8. The method of claim 7, wherein the output is associated with an angle between linkages connecting a lower control arm of the suspension assembly to the chassis.

9. The method of claim 6, wherein:
the estimated steering data includes an estimated rack travel distance; and
the method further comprises:
receiving steering sensor data associated with a rack travel distance; and
determining whether a difference between the estimated rack travel distance and the rack travel distance is less than or equal to a threshold.

10. The method of claim 6, wherein the second sensor data comprises sensor data from at least one of a chassis position sensor, a lidar sensor, a camera, a time-of-flight sensor, and an inertial measurement unit (IMU).

11. The method of claim 6, wherein:
the estimated steering data includes an estimated rotation value; and
the method further comprises:
receiving steering sensor data associated with a rotation value of a steering motor of the vehicle; and
determining whether a difference between the estimated rotation value and the rotation value is equal to or below a threshold.

12. The method of claim 11, further comprising:
determining, based on the angle and the estimated displacement value an estimated rack travel distance; and
determining, based on the estimated rack travel distance, the estimated rotation value.

13. The method of claim 6, further comprising:
receiving steering sensor data; and
determining that a difference between the estimated steering data and the steering sensor data is equal to or below a threshold, wherein the controlling the operation of the vehicle includes determining, based on the difference being equal to or below the threshold, a steering angle of the vehicle.

14. One or more non-transitory computer-readable media storing instructions that, when executed, cause one or more processors to perform operations comprising:
receiving, from a ball joint sensor, first sensor data being associated with an angle of a ball joint, which articulates when a suspension assembly of a vehicle moves relative to a chassis of the vehicle, the ball joint sensor comprising at least one of a hall effect sensor, a magnetic pickup, an optical sensor, or a potentiometer arranged in a ball socket of the ball joint;
receiving second sensor data comprising an estimated displacement value associated with the suspension assembly and the chassis, wherein the estimated displacement value is a measure of a distance between a ground plane and a reference point on the vehicle;

determining, based on the angle and the estimated displacement value, estimated steering data; and controlling, based at least in part on the estimated steering data, an operation of the vehicle.

15. The one or more non-transitory computer-readable media of claim 14, the operations further comprising:

receiving an output associated with a chassis position sensor, wherein the output is associated with an angle between linkages connecting a lower control arm of the suspension assembly to the chassis; and determining, based on the output, the estimated displacement value.

16. The one or more non-transitory computer-readable media of claim 14, the operations further comprising:

receiving steering sensor data; and comparing, as a comparison, the estimated steering data to the steering sensor data, wherein the controlling the operation is based at least in part on the comparison.

17. The one or more non-transitory computer-readable media of claim 16, wherein:

the steering sensor data comprises a rack travel distance;

the estimated steering data is an estimated rack travel distance; and the comparing includes determining whether a difference between the estimated rack travel distance and the rack travel distance satisfies a threshold.

18. The one or more non-transitory computer-readable media of claim 17, the operations further comprising:

receiving steering motor rotation data associated with a steering motor of the vehicle; and determining the rack travel distance based on the steering motor rotation data.

19. The one or more non-transitory computer-readable media of claim 16, wherein:

the steering sensor data comprises a rotation value associated with a steering motor of the vehicle;

the estimated steering data is an estimated rotation value; and the comparing includes determining whether a difference between the estimated rotation value and the rotation value satisfies a threshold.

20. The system of claim 1, wherein the estimated steering data and the steering sensor data are based on sensor data and represent a measured state of the vehicle.

* * * * *